(12) United States Patent
Kadota (10) Patent No.: US 11,228,744 B2
(45) Date of Patent: Jan. 18, 2022

(54) METHOD FOR CONTROLLING PROJECTION SYSTEM, PROJECTION SYSTEM, AND CONTROL PROGRAM

(71) Applicant: SEIKO EPSON CORPORATION, Tokyo (JP)

(72) Inventor: Kentaro Kadota, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/131,109

(22) Filed: Dec. 22, 2020

(65) Prior Publication Data

US 2021/0203897 A1 Jul. 1, 2021

(30) Foreign Application Priority Data

Dec. 26, 2019 (JP) .............................. JP2019-235872

(51) Int. Cl.
*H04N 9/31* (2006.01)
*G03B 21/14* (2006.01)

(52) U.S. Cl.
CPC .......... *H04N 9/3182* (2013.01); *H04N 9/3185* (2013.01); *H04N 9/3194* (2013.01)

(58) Field of Classification Search
CPC ...... G03B 21/00; G03B 21/14; G03B 21/142; G03B 21/147; G03B 21/26; G03B 21/005; G03B 21/006; G03B 21/007; H04N 9/31; H04N 9/3182; H04N 9/3194; H04N 9/3185
See application file for complete search history.

(56) References Cited

U.S. PATENT DOCUMENTS

| | | | |
|---|---|---|---|
| 8,508,615 B2 * | 8/2013 | Tan | H04N 9/3182 348/222.1 |
| 2010/0315825 A1 | 12/2010 | Kawamura | |
| 2011/0298960 A1 * | 12/2011 | Tan | H04N 9/3194 348/333.1 |
| 2012/0315018 A1 * | 12/2012 | Gohshi | G03B 21/26 386/254 |
| 2017/0339378 A1 * | 11/2017 | Okumura | G06F 3/017 |
| 2018/0088447 A1 * | 3/2018 | Otani | H04N 9/315 |
| 2021/0195153 A1 * | 6/2021 | Suzuki | G03B 21/00 |

FOREIGN PATENT DOCUMENTS

| | | |
|---|---|---|
| JP | 2009-225432 A | 10/2009 |
| JP | 2014-186104 A | 10/2014 |
| JP | 2016-149618 A | 8/2016 |

* cited by examiner

*Primary Examiner* — William C. Dowling
(74) *Attorney, Agent, or Firm* — Dority & Manning, P.A.

(57) ABSTRACT

A method for controlling a projection system including a projector and a portable apparatus including a camera includes causing the projector to project light representing a pattern image, acquiring image data from the camera that captures the light, determining a path in the pattern image based on a change in the image data according to displacement of the camera, and generating a filter that changes a portion of an image projected by the projector in the range defined by the path.

8 Claims, 6 Drawing Sheets

| a | a | a | a | a | a | ~51 |
|---|---|---|---|---|---|
| b | b | b | b | b | b |
| T c | c | c | c | c | c |
| d | d | d | d | d | d |

FIG. 6

| a | b | c | d | e | f | ~52 |
|---|---|---|---|---|---|
| a | b | c | d | e | f |
| T a | b | c | d | e | f |
| a | b | c | d | e | f |

FIG. 7

METHOD FOR CONTROLLING PROJECTION SYSTEM, PROJECTION SYSTEM, AND CONTROL PROGRAM

The present application is based on, and claims priority from JP Application Serial Number 2019-235872, filed Dec. 26, 2019, the disclosure of which is hereby incorporated by reference herein in its entirety.

BACKGROUND

1. Technical Field

The present disclosure relates to a method for controlling a projection system, a projection system, and a control program.

2. Related Art

JP-A-2014-186104 discloses a projection system that detects information on the positions of four points representing regions where projection regions of two projection apparatuses overlap with each other by using an interactive pointer that reads the illuminance in a position at which the pointer is pointing to detect the coordinates of the position.

However, the technology described in JP-A-2014-186104, which is a technology for detecting a quadrangular region, has a difficulty in determining a non-quadrangular region in some cases.

SUMMARY

An aspect of the present disclosure is directed to a method for controlling a projection system including a projector and a portable apparatus including a camera, the method including causing the projector to project light representing a pattern image, acquiring image data from the camera that captures the light, determining a path in the pattern image based on a change in the image data according to displacement of the camera, and generating a filter that changes a portion of an image projected by the projector in a range defined by the path.

Another aspect of the present disclosure is directed to a projection system including a projector that projects light representing a pattern image and a camera that captures the light to produce image data. A path in the pattern image is determined based on a change in the image data according to displacement of the camera, and a filter that changes a portion of an image projected by the projector in a range defined by the path is generated.

Another aspect of the present disclosure is directed to a control program that causes a computer to cause a projector to project light representing a pattern image, acquire image data from a camera that captures the light, determine a path in the pattern image based on a change in the image data according to displacement of the camera, and generate a filter that changes a portion of an image projected by the projector in a range defined by the path.

DESCRIPTION OF EXEMPLARY EMBODIMENTS

Figure 1:
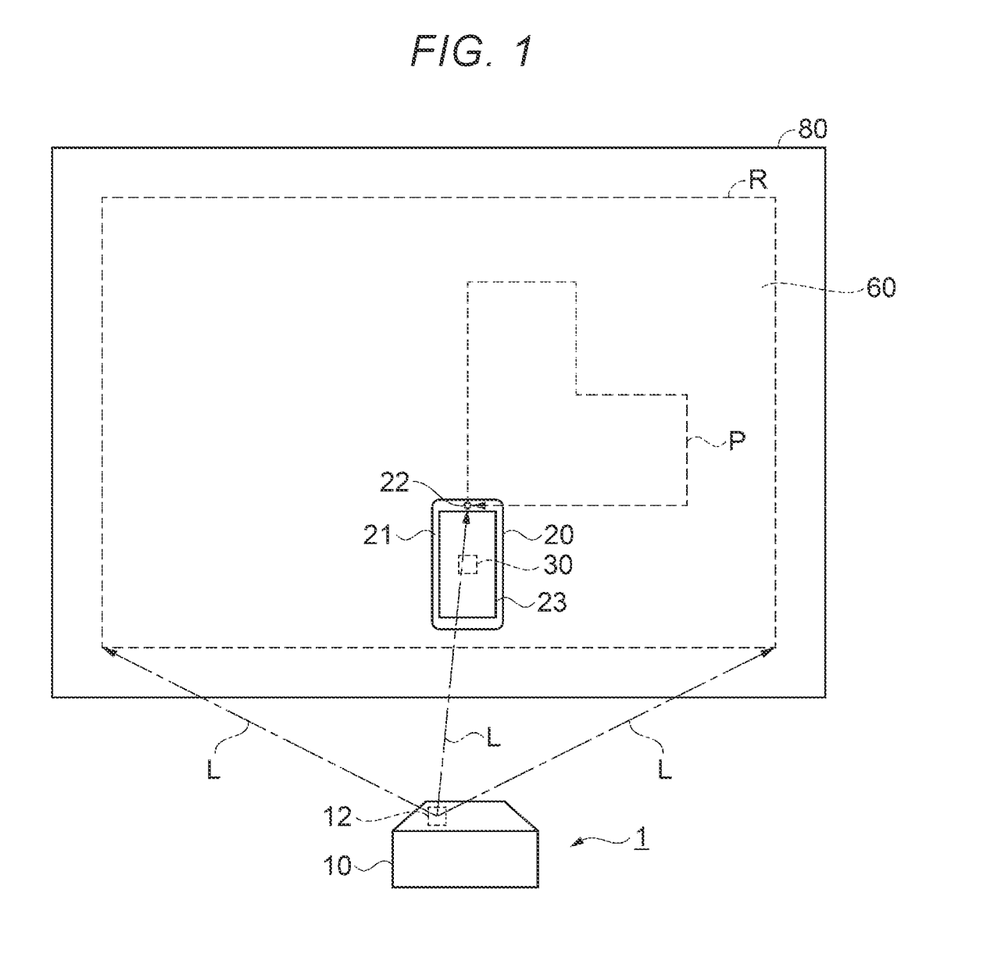
FIG. 1 is a perspective view for describing a projection system according to an embodiment.

A projection system 1 according to an embodiment includes a projector 10 and a portable apparatus 20, which includes a camera 22, as shown in FIG. 1. The projector 10 projects light L representing an image within a projection range R. In the example shown in FIG. 1, the projector 10 projects the light L within the projection range R to display the image on a projection target 80 present in the projection range R. The projection target 80 may be a white flat surface, such as a rolling screen and a whiteboard, or may be a three-dimensional object having, for example, a curved surface. The number of projection targets 80 may be two or more in the projection range R.

Figure 2:
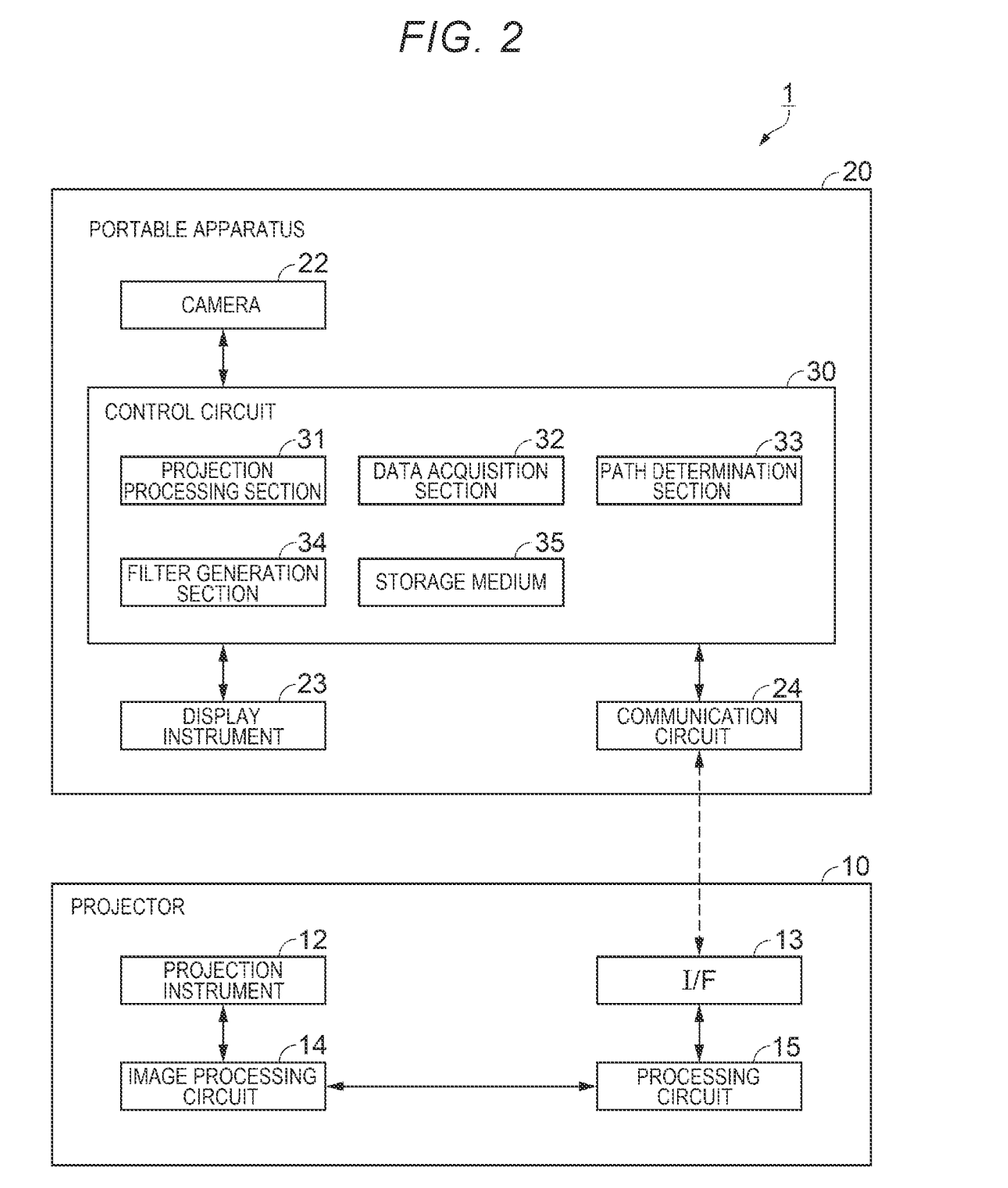
FIG. 2 is a block diagram for describing a basic configuration of the projection system according to the embodiment.

The projector 10 includes a projection instrument 12, an interface (I/F) 13, an image processing circuit 14, and a processing circuit 15, as shown in FIG. 2. The projection instrument 12 includes, for example, a light source, such as a discharge lamp and a solid-state light source, a display device, such as a liquid crystal light valve having a plurality of pixels, and an optical system including a mirror, a lens, and other optical components. The display device modulates the light emitted from the light source under the control of the processing circuit 15. The projection instrument 12 projects the light having traveled via the display device within the projection range R via the optical system as the light L representing an image. The projection instrument 12 may instead operate based on a scheme using a mirror device that scans the projection range R with the modulated light or a scheme using a digital micromirror device that controls light reflection on a pixel basis.

The I/F 13 communicates with the portable apparatus 20, for example, via a communication link between the I/F 13 and the portable apparatus 20. The communication link between the I/F 13 and the portable apparatus 20 may be a wired or wireless communication link or may be the combination of a wired communication link and a wireless communication link. The I/F 13 may include, for example, an antenna via which a wireless signal is sent and received, a receptacle into which a plug of a communication cable is inserted, and a circuit that establishes the communication link and processes a signal transmitted over the communication link. The I/F 13 may be configured to receive a video signal as an input from an external apparatus that is not shown.

The image processing circuit 14 produces an image signal representing an image to be projected within the projection range R and outputs the image signal to the projection instrument 12 under the control of the processing circuit 15. The image processing circuit 14 may produce an image signal representing a computer graphics image produced by a control program executed by the processing circuit 15 or may produce an image signal from the video signal inputted from the external apparatus via the I/F 13. The image processing circuit 14 outputs the image signal, which is successively produced, to the projection instrument 12. The image processing circuit 14 includes a rendering engine, a graphics memory, and other components. The image processing circuit 14 may function as a circuit that forms part of the processing circuit 15.

The processing circuit 15 includes, for example, a processing apparatus that processes operation necessary for the action of the projector 10. The processing circuit 15, for example, executes a preinstalled program to achieve the functions described in the embodiment. Employable examples of the processing apparatus that forms at least part of the processing circuit 15 may include a central processing unit (CPU), a digital signal processor (DSP), a programmable logic device (PLD), an application specific integrated circuit (ASIC), and other logic operation circuits. The processing circuit 15 may be formed of an integrated hardware component or a plurality of separate hardware components.

The portable apparatus 20 may include, for example, a control circuit 30, a display instrument 23, and a communication circuit 24 in addition to the camera 22. In this case, any of a variety of electronic apparatuses, such as a smartphone, a tablet terminal, and a laptop computer, can be employed as the portable apparatus 20. The following description will be made on the assumption that the portable apparatus 20 is a smartphone by way of example. The camera 22 includes a solid-state imaging device and an optical system that focuses light corresponding to the field of view of the camera 22 onto the solid-state imaging device. The camera 22 successively produces image data representing an image corresponding to the field of view of the camera 22 with the aid of the solid-state imaging device and outputs the image data to the control circuit 30.

The display instrument 23 displays on the screen thereof a variety of images under the control of the control circuit 30. A variety of displays, such as a liquid crystal display and an organic electro-luminescence display, can be employed as the display instrument 23. The display instrument 23 may be integrated as a touch panel display with an input instrument. In the example shown in FIG. 1, the camera 22 is disposed in the surface where the screen of the display instrument 23 is disposed out of the surfaces of an enclosure 21 of the portable apparatus 20. The display instrument 23 can display an image captured with the camera 22 on the screen under the control of the control circuit 30.

The communication circuit 24 communicates with the projector 10, for example, via the communication line between the communication circuit 24 and the I/F 13 of the projector 10. The communication circuit 24 may include, for example, an antenna via which a wireless signal is sent and received, a receptacle into which a plug of a communication cable is inserted, and a communication circuit that establishes the communication link and processes a signal transmitted over the communication link.

The control circuit 30 includes a projection processing section 31, a data acquisition section 32, a path determination section 33, a filter generation section 34, and a storage medium 35. The control circuit 30 includes a processing apparatus that processes operation necessary for the action of the projector system 1. Employable examples of the processing apparatus that forms at least part of the control circuit 30 may include a CPU, a DSP, a PLD, an ASIC, and a variety of other logic operation circuits. The storage medium 35 is a computer readable storage apparatus that stores a control program, a variety of data, and other pieces of information necessary for the action of the projection system 1. The control program can be provided from a server on a network via the communication circuit 24. A semiconductor memory can, for example, be employed as the storage medium. The storage medium 35 is not limited to a nonvolatile auxiliary storage apparatus and may include a nonvolatile primary storage apparatus, such as a register and a cash memory built in a CPU.

The control circuit 30 functions as a computer that executes the control program stored in the storage medium 35 to achieve the projection processing section 31, the data acquisition section 32, the path determination section 33, and the filter generation section 34. That is, the projection processing section 31, the data acquisition section 32, the path determination section 33, the filter generation section 34, and the storage medium 35 are each expressed as a logic structure in FIG. 2. The control circuit 30 may be formed of an integrated hardware component or two or more separate hardware components.

The projection processing section 31 reads data representing a pattern image 60 from the storage medium 35 and transmits the data to the projector 10, as shown in FIG. 1. The projection processing section 31 thus causes the projector 10 to project the light L representing the pattern image 60. Specifically, the projection processing section 31 sends the data representing the pattern image 60 to the processing circuit 15 via the communication circuit 24 and the I/F 13. The image processing circuit 14 produces a signal representing the pattern image 60 and outputs the signal to the projection instrument 12 under the control of the control circuit 15. The projection processing section 31 thus sends the data representing an image to be projected to the projector 10 to control an image to be projected by the projector 10.

The data acquisition section 32 successively acquires image data from the camera 22 that captures the light L representing the pattern image 60. The camera 22 may directly capture the light L projected from the projector 10. In this case, a projection lens of the projection instrument 12 falls within the field of view of the camera 22, and the camera 22 is disposed within the projection range R. In the example shown in FIG. 1, the camera 22 faces the 10 in the projection range R and can therefore directly capture the light L. Since the light L is substantially light that belongs to the visible light region, a typical camera provided in a smartphone can be used as the camera 22.

The path determination section 33 determines a path P in the pattern image 60 based on a change in the image data according to displacement of the camera 22. The portable apparatus 20 is so moved, for example, by a user with the camera 22 facing the projector 10 in the projection range R that the trajectory of the camera 22 draws a closed path P. The image data acquired by the data acquisition section 32 during the movement of the camera 22 successively changes in accordance with the displacement of the camera 22 with respect to the pattern image 60. The path determination section 33 determines the path P in the pattern image 60 based on a change in the image data generated by the camera 22. The pattern image 60 is therefore so patterned that the path P is determined based on a change in the image data. The user can improve the similarity of the trajectory of the camera 22 to an intended path P by moving the camera 22 with the camera 22 facing the projector 10 while visually recognizing the camera 22 in a position close to the projection target 80.

The filter generation section 34 generates a filter that changes a portion of an image projected by the projector 10 in the range defined by the path P. The path P and the range defined by the path P are determined with respect to the projection range R. The range defined by the path P, that is, the range within which the image is changed may be the range surrounded by the path P or the range excluding the range surrounded by the path P from the projection range P. The filter has, for example, information on whether or not projection is performed within the range defined by the path P. The filter generation section 34 sends the generated filter to the projector 10 via the communication circuit 24. The projector 10 projects an image to which the filter generated by the filter generation section 34 is applied in the projection range R under the control of the control circuit 15.

Figure 3:
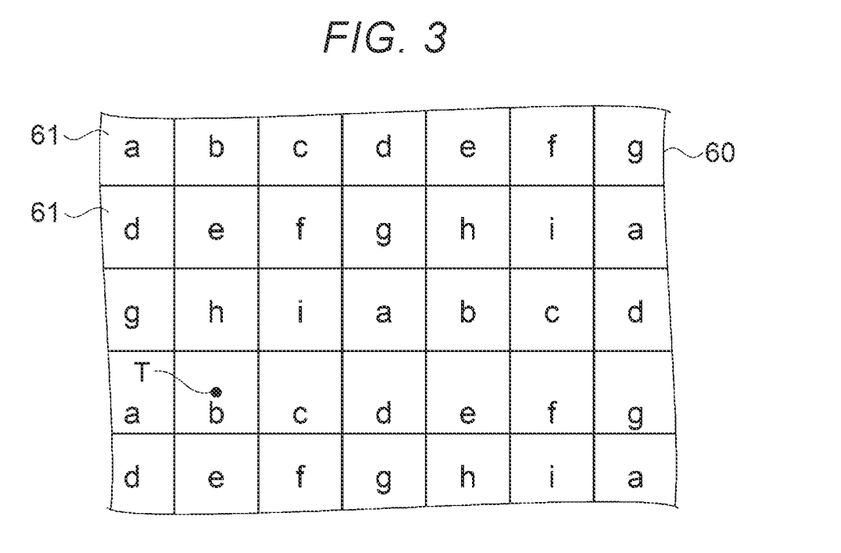
FIG. 3 describes an example of a pattern image.

The pattern image 60 is defined as a two-dimensional matrix formed of regions 61 so arranged that regions 61 adjacent to each other have colors different from each other, as shown, for example, in FIG. 3. The nine letters a, b, c, d, e, f, g, h, and i mean nine colors different from one another. The regions 61 of the pattern image 60 are filled with the colors corresponding to the letters. The colors of the regions 61 are cyclically arranged in each row in the order of a to i. With respect to each row, the adjacent upper row is shifted leftward by three columns, and the adjacent lower row is shifted rightward by three columns. The color arrangement described above allows the pattern image 60 to be so defined that the regions 61 each do not have the same color as that of any adjacent regions 61.

For example, when a position T, which forms the trajectory of the camera 22, is located in a region 61 having the color b, the path determination section 33 detects the color b from the image data. The field of view of the camera 22 contains the projection instrument 12, which outputs the light L. The path determination section 33 therefore detects the color in the position T, for example, out of the image indicated by the image data, the position T is detected by the luminance of the area is greater than a threshold, and the color in the position T is selected from a to i in the pattern image 60. Since the colors of the eight regions 61 around the region 61 having the color b are g, h, i, a, c, d, e, and f, respectively, the trajectory of the camera 22 is uniquely determined based on a change in the color of the image data irrespective of the moving direction of the position T out of the eight directions from the position T.

For example, a case where the path determination section 33 sequentially detects the color b followed by the colors c and d means that the position T moves rightward from the state shown in FIG. 3. The path determination section 33 causes the storage medium 35 to successively store the order of the detected colors as the change in the color in the position T. The path determination section 33 compares the color arrangement of the pattern image 60 with the change in the color in the position T in the image data to determine the path P in the pattern image 60. The path P is thus uniquely determined.

Figure 4:
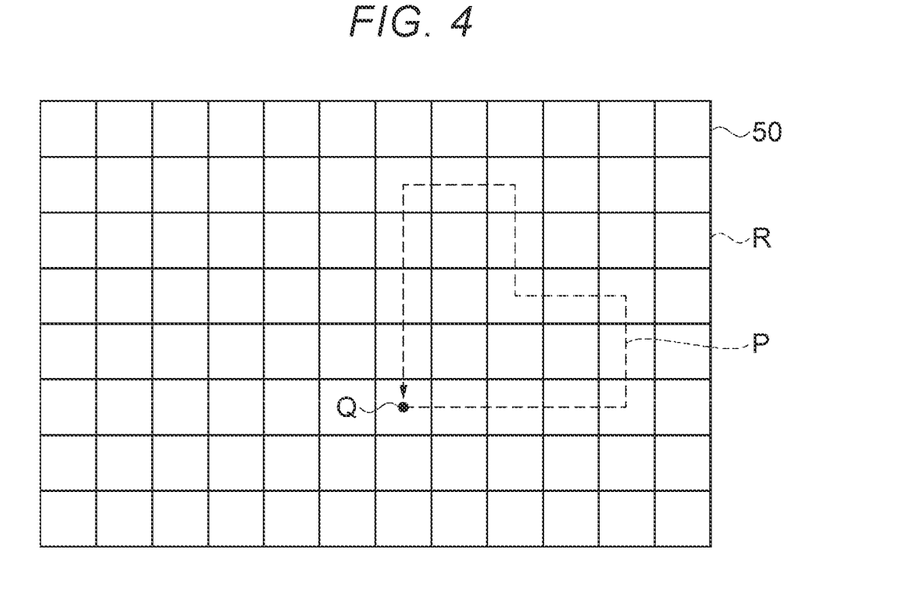
FIG. 4 describes an example of a position determining image.

The path determination section 33 may determine an initial position Q, which is the start point of the path P, by using a position determining image 50, as shown in FIG. 4. The projection processing section 31 sends data representing the position determining image 50 to the projector 10 to cause the projector 10 to project the position determining image 50. The path determination section 33 determines the initial position Q, which is the position T in the position determining image 50.

Figure 5:
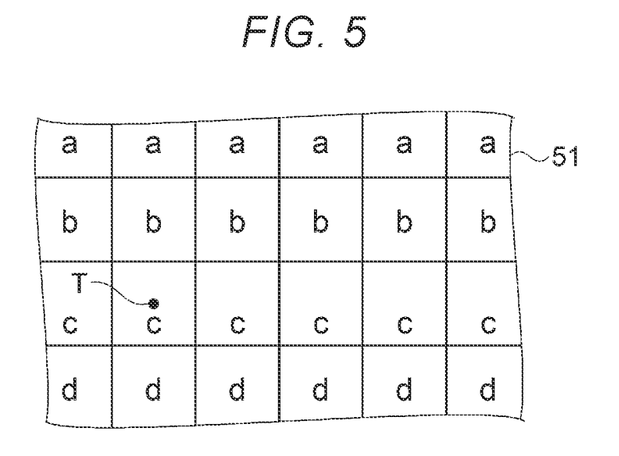
FIG. 5 describes an example of a first image.
Figure 6:
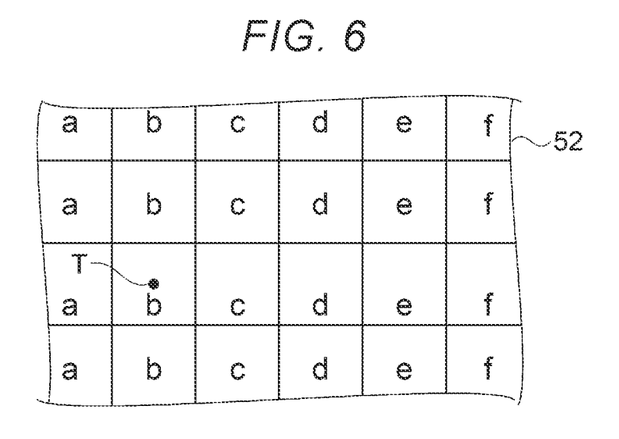
FIG. 6 describes an example of a second image.

Video images formed of a first image 51 and a second image 52 can, for example, be employed as the position determining image 50, as shown in FIGS. 5 and 6. The first image 51 has horizontal stripes defined by rows corresponding to the pattern image 60, and the rows have colors different from one another. The second image 52 has vertical stripes defined by columns corresponding to the pattern image 60, and the columns have colors different from one another.

The projection processing section 31 sends data representing the first image 51 to the projector 10 and causes the projector 10 to project the first image 51 within the projection range R. When the position T, which forms the trajectory of the camera 22, is located in the row having the color c, as shown in FIG. 5, the path determination section 33 detects the color c from the image data. After a predetermined period, for example, 0.5 seconds, elapses from the start of the projection of the first image 51, the projection processing section 31 sends data representing the second image 52 to the projector 10 to cause the projector 10 to project the second image 52 within the projection range R. When the position T is located in the column having the color b, as shown in FIG. 6, the path determination section 33 detects the color b from the image data.

When the color detected in the image data changes from c to b, the path determination section 33 can determine the row of the first image 51 and the column of the second image 52 where the position T is located to uniquely determine the position T in the projection range R. It is, however, noted that the position and attitude of the camera 22 is substantially fixed during the path determination. As described above, the path determination section 33 compares the color arrangement of each of the first image 51 and the second image 52 with a change in the color in the image data to determine the initial position Q in the projection range R. The number of images that form the position determining image 50 may be three or more. Upon the determination of the initial position Q, the projection processing section 31 causes the projector 10 to project the pattern image 60, and the path determination section 33 starts the determination of the path P.

Figure 7:
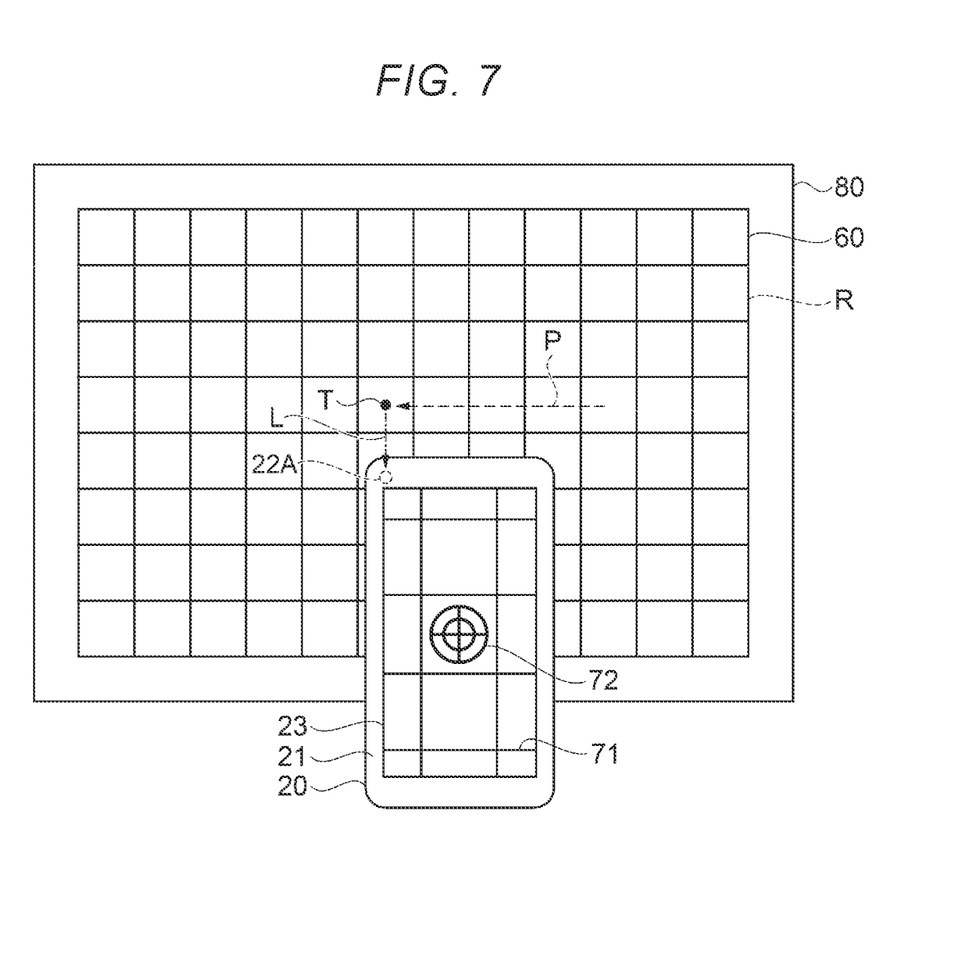
FIG. 7 describes an example of determination of a path.

The portable apparatus 20 may include a camera 22A, which is disposed in the surface facing the screen of the display instrument 23 out of the surfaces of the enclosure 21, as shown in FIG. 7. The display instrument 23 displays an image captured with the camera 22A on the screen. The portable apparatus 20 only needs to include at least one of the cameras 22 and 22A. In the example shown in FIG. 7, the camera 22A captures the light L reflected off the surface of the projection target 80, on which the pattern image 60 is projected.

The display instrument 23 displays a captured image 71, which is captured with the camera 22A, and an index 72, which points at a point in the captured image 71, on the screen under the control of the control circuit 30. In this case, the path determination section 33 can determine the path P based on the trajectory of the index 72 in the pattern image 60 displayed as the captured image 71 on the screen. In the example shown in FIG. 7, the center of the index 72 in the pattern image 60 that is the captured image 71 corresponds to the position T in the pattern image 60 actually projected on the projection target 80. The position T is determined by the combination of the position and orientation of the camera 22A. That is, the image data acquired by the data acquisition section 32 from the camera 22A changes in accordance with the displacement of the camera 22A. Since the index 72 is displayed on the display instrument 23, the user can recognize the point corresponding to the position T in the captured image 71 and achieve an intended path P. The point at which the index 72 points does not, of course, need to be exactly a point and can have an area.

The path determination section 33 determines the path P in the pattern image 60 based on a change in the image data according to the displacement of the camera 22A. Specifically, the path determination section 33 can compare the color arrangement in the pattern image 60, for example, the color arrangement shown in FIG. 3, with a change in the color in the position T in the image data to determine the path P. When the color of the projection target 80 is white, the path determination section 33 can determine the color in the position T based on a color of the captured image 71 that is the color corresponding to the center of the index 72. It is, however, noted that the color of the projection target 80 is not limited to white as long as the colors of the pattern image 60 projected on the projection target 80 can each be detected, for example, by defining the amount of correction of the color in advance for each of the regions 61. The path determination section 33 may determine the initial position Q in the projection range R by using the position determining image 50, as described above.

Figure 8:
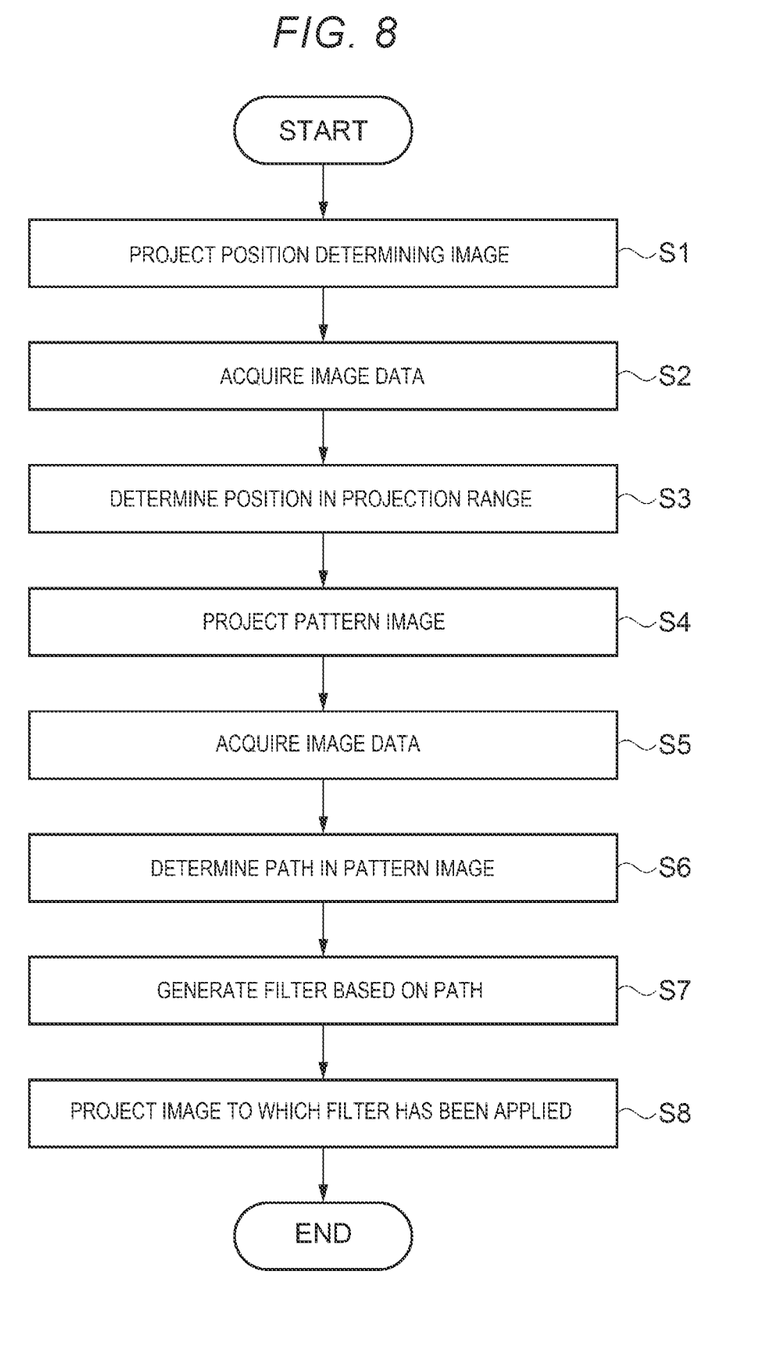
FIG. 8 is a flowchart for describing a method for controlling the projection system according to the embodiment.

An example of the action of the projection system 1 will be described below as a method for controlling the projection system 1 with reference to the flowchart of FIG. 8.

In step S1, the projection processing section 31 sends data representing the position determining image 50 to the projector 10 to cause the projector 10 to project the light L representing the position determining image 50. In step S2, the data acquisition section 32 acquires image data from the camera 22 that captures the light L. In step S3, the path determination section 33 determines the initial position Q in the projection range R based on the position determining image 50 and a change in the image data.

In step S4, the projection processing section 31 sends data representing the pattern image 60 to the projector 10 to cause the projector 10 to project the light L representing the pattern image 60. In step S5, the data acquisition section 32 acquires image data from the camera 22 that captures the light L. In step S6, the path determination section 33 determines the path P in the pattern image 60 based on a change in the image data according to the displacement of the camera 22.

In step S7, the filter generation section 34 generates a filter that changes a portion of an image projected by the projector 10 in the range defined by the path P. The filter generation section 34 sends the generated filter to the projector 10 via the communication circuit 24. In step S8, the projector 10 projects an image to which the filter generated by the filter generation section 34 has been applied in the projection range R under the control of the control circuit 15.

The projection system 1 determines the path P in the pattern image 60 based on a change in the image data according to the displacement of the camera 22 and generates a filter that changes a portion of an image to be projected in the range defined by the path P. Therefore, according to the projection system 1, arbitrary shapes including shapes excluding quadrangles in the projection range R can be determined. Further, applying the filter to the projector 10 allows a change in an image projected in the range defined by the path P.

When the camera 22 directly captures the light L projected from the projector 10, the distance between the projection target 80 and the camera 22 can be shortened, whereby the trajectory of the camera 22 in accordance with which the user determines the path P can be precisely achieved. On the other hand, when the camera 22A indirectly captures the light L reflected off the projection target 80, the distance between the projection target 80 and the camera 22A can be lengthened. The trajectory of the camera 22A can therefore be achieved, for example, with the projector 10 located between the user and the projection target 80.

The embodiment has been described above, and the present disclosure is not limited to the above disclosure. The configuration of each portion may be replaced with an arbitrary configuration having the same function, and an arbitrary configuration in the embodiment may be omitted or added within the technical scope of the present disclosure. The disclosure of such replacement, omission and addition thus allows a person skilled in the art to conceive of a variety of alternate embodiments.

For example, in the embodiment having already been described, the functions of the control circuit 30 may not necessarily be achieved in the portable apparatus 20. That is, the functions of the control circuit 30 may be achieved by the processing circuit 15 or may be achieved by a computer different from the portable apparatus 20 and the projector 10. The functions described in the embodiment described above can be implemented by one or more logic operation circuits. The portable apparatus 20 is not limited to a general-purpose device, such as a smartphone, and may be an apparatus that includes the camera 22, which produces image data, and sends the image data to the control circuit 30.

The projection processing section 31 does not need to cause the projector 10 to project the position determining image 50 when the path determination section 33 determines the path P by using a method that allows recognition of the initial position Q. For example, in the example shown in FIG. 7, where the captured image 71 and the index 72 are used, the path determination section 33 may determine the path P by using an optical flow in the image data according to the displacement of the camera 22A. The trajectory of the position T, which determines the path P, does not need to be fully closed. For example, when the trajectory is open when the acquisition of image data is completed, the path determination section 33 may automatically connect the start point to the end point of the trajectory to determine a closed path P. The pattern image 60 may have a plurality of regions other than rectangular regions. For example, the pattern image 60 can be defined by a plurality of regions that are each a regular polygon. In addition to the above, the filter generated by the filter generation section 34 is not limited to a filter that changes whether or not projection is performed in the range defined by the path P. The filter may, for example, change the brightness, color tone, a signal source of an image, or any other factor in the range defined by the path P.

In addition to the above, the present disclosure, of course, encompasses a variety of embodiments that are not described in the above sections, such as a configuration to which the configurations described above are mutually applied. The technical scope of the present disclosure is specified only by the inventive specific items according to the claims that are reasonably derived from the above description.

What is claimed is:

1. A method for controlling a projection system including a projector and a portable apparatus including a camera, the method comprising:
   causing the projector to project light representing a pattern image;
   acquiring image data from the camera that captures the light;
   determining a path is the pattern image based on a change in the image data according to displacement of the camera; and
   generating a filter that changes a portion of an image projected by the projector in a range defined by the path.

2. The method for controlling a projection system according to claim 1, wherein the camera directly captures the light projected from the projector.

3. The method for controlling a projection system according to claim 1, wherein the camera captures the light reflected off a projection target on which the pattern image is projected.

4. The method for controlling a projection system according to claim 3,
wherein the portable apparatus includes a display instrument that displays a captured image captured with the camera and an index that points at a point in the captured image on a screen of the display instrument, and
the path is determined based on a trajectory of the index in the pattern image displayed on the screen.

5. The method for controlling a projection system according to claim 1, wherein the pattern image is defined as a two-dimensional matrix formed of regions so arranged that regions adjacent to each other have colors different from each other.

6. The method for controlling a projection system according to claim 5, wherein the path in the pattern image is determined by comparing a color arrangement of the pattern image with a change in a color in the image data.

7. A projection system comprising:
a projector that projects light representing a pattern image; and
a camera that captures the light to produce image data,
wherein a path in the pattern image is determined based on a change in the image data according to displacement of the camera, and a filter that changes a portion of an image projected by the projector in a range defined by the path is generated.

8. A control program that causes a computer to:
cause a projector to project light representing a pattern image;
acquire image data from a camera that captures the light;
determine a path in the pattern image based on a change in the image data according to displacement of the camera; and
generate a filter that changes a portion of an image projected by the projector in a range defined by the path.

* * * * *